US012673826B2

(12) United States Patent
Purpus et al.

(10) Patent No.: US 12,673,826 B2
(45) Date of Patent: Jul. 7, 2026

(54) CONVEYING ARRANGEMENT

(71) Applicant: Interroll Holding AG, Sant'Antonino (CH)

(72) Inventors: Fabian Purpus, Hückelhoven (DE); Florian Funk, Hückelhoven (DE); Jens Friedrichs, Hückelhoven (DE); Thomas Bertran, Hückelhoven (DE)

(73) Assignee: Interroll Holding AG, Sant'Antonino (CH)

( * ) Notice: Subject to any disclaimer, the term of this patent is extended or adjusted under 35 U.S.C. 154(b) by 63 days.

(21) Appl. No.: 18/281,314

(22) PCT Filed: Mar. 14, 2022

(86) PCT No.: PCT/EP2022/056453
§ 371 (c)(1),
(2) Date: Sep. 11, 2023

(87) PCT Pub. No.: WO2022/194738
PCT Pub. Date: Sep. 22, 2022

(65) Prior Publication Data
US 2024/0158175 A1 May 16, 2024

(30) Foreign Application Priority Data

Mar. 16, 2021 (DE) .......................... 102021106398.1
Jun. 30, 2021 (DE) .......................... 102021116874.0

(51) Int. Cl.
B65G 11/20 (2006.01)
(52) U.S. Cl.
CPC .................................. B65G 11/203 (2013.01)

(58) Field of Classification Search
CPC .............................. B65G 11/203; B65G 11/20
USPC .......................................................... 193/32
See application file for complete search history.

(56) References Cited

U.S. PATENT DOCUMENTS

| 1,019,621 | A | | 3/1912 | Beom |
| 2,865,578 | A | | 12/1958 | Carroll |
| 3,136,401 | A | | 6/1964 | Atanasoff |
| 4,807,734 | A | * | 2/1989 | Breeland, Jr. .......... G21C 21/00 |
| | | | | 198/956 |

(Continued)

FOREIGN PATENT DOCUMENTS

| DE | 1481438 A | 4/1969 |
| DE | 19719748 C2 | 11/1998 |

(Continued)

*Primary Examiner* — Douglas A Hess
(74) *Attorney, Agent, or Firm* — Biotech Beach Law PC; Raymond Wagenknecht

(57) ABSTRACT

Conveyor arrangement (1), comprising a terminal chute (11, 12, . . . ), adapted to
the takeover a conveyed object (9), in particular a postal parcel (9), at a takeover area (A1), in particular from an upstream feed in device (7);
for transferring the conveyed object (9) at a transfer area (A3), in particular at a terminal (4);
for transmitting the conveyed object (9) in a chute area (A2) from the takeover area (A1) to the transfer area (A3),
wherein the terminal chute is inclined downwardly in the conveying direction (F) so that the conveyed object (9) is conveyed in a gravitationally sliding manner,
in particular comprising means for reducing damage to the conveyed material.

7 Claims, 12 Drawing Sheets

(56)     References Cited

U.S. PATENT DOCUMENTS

| | | | | |
|---|---|---|---|---|
| 6,095,314 | A * | 8/2000 | Fortenbery | B65G 47/766 |
| | | | | 198/360 |
| 6,499,582 | B1 | 12/2002 | Gillott | |
| 6,634,485 | B1 * | 10/2003 | Cailbault | B65G 69/16 |
| | | | | 198/417 |
| 7,581,629 | B2 * | 9/2009 | Kohler | B65G 11/186 |
| | | | | 193/25 E |
| 9,126,758 | B2 | 9/2015 | Kennedy et al. | |
| 9,592,983 | B2 * | 3/2017 | Costanzo | B07C 3/00 |
| 9,969,554 | B2 * | 5/2018 | Hartmann | B65G 11/203 |
| 10,059,522 | B2 * | 8/2018 | Wargo | B65G 17/40 |
| 11,661,282 | B2 * | 5/2023 | Zhang | G21C 5/02 |
| | | | | 193/32 |
| 12,037,197 | B2 * | 7/2024 | Grafe | B65G 11/203 |
| 12,098,038 | B2 * | 9/2024 | Senninger | B65G 47/967 |
| 12,180,007 | B2 * | 12/2024 | Casper | B65G 11/063 |
| 2018/0127213 | A1 | 5/2018 | Wargo | |

FOREIGN PATENT DOCUMENTS

| | | | |
|---|---|---|---|
| DE | 102006016596 | B3 | 8/2007 |
| DE | 102010005267 | A1 | 7/2011 |
| DE | 102019119696 | A1 | 7/2020 |
| DE | 102019119595 | A1 | 1/2021 |
| EP | 1389596 | A1 | 2/2004 |
| EP | 1868923 | B1 | 5/2010 |
| EP | 2922775 | B1 | 9/2016 |
| GB | 2265876 | A | 10/1993 |
| KR | 101395062 | B1 | 5/2014 |
| KR | 10-2018-0058945 | | 5/2018 |
| WO | 2019002048 | A1 | 1/2019 |

* cited by examiner a)

b)

c)

a)

b)

a)        b)        c)

CONVEYING ARRANGEMENT

CROSS REFERENCE TO RELATED APPLICATIONS

This application is the U.S. national stage of International Application No. PCT/EP2022/056453, filed on 2022 Mar. 14. The international application claims the priority of DE 102021106398.1 filed on 2021 Mar. 16 and the priority of DE 102021116874.0 filed on 2021 Jun. 30; all applications are incorporated by reference herein in their entirety.

BACKGROUND

The invention relates to a conveyor arrangement.

At the terminals in a parcel distribution center, parcels are loaded into delivery trucks or trolleys that are assigned to specific target regions. A sorter, for example a crossbelt sorter (e.g. WO 2019/002048 A1), sorts the parcels and feeds them to the individual terminals. To overcome height differences, inclined chutes are used between the sorter and the terminal, in which the parcels slide along due to gravity. This can cause damage to the parcels. In addition, parcel jams frequently occur, which can pressurize parcels at the bottom and thus damage them.

EP 1 868 923 B1 discloses an terminal chute with two rollers running transversely to the conveying direction of the chute and driven in the conveying direction. The speed of one roller is selected to be higher than another roller the closer the respective roller is to the exit side.

DE 10 2019 119 696 A1 discloses a conveying device for converting a serially transported stream of unit loads into a parallel transported stream of unit loads.

DE 10 2010 005 267 A1 discloses a piece goods distribution system with an automatic sorting system. A manual distribution area and a conveying device are provided. The conveyor device has a conveyor head with a receiving area for manually placing piece goods. The conveyor head can be displaced in space.

DE 197 19 748 C2 discloses a device for handling parcels for loading and unloading a cargo compartment in which the parcels are stacked on top of each other.

EP 2 922 775 B1 discloses a brake roller based on magnetic eddy current. This brake can brake a conveyed object, but not hold it at a standstill.

SUMMARY

Conveyor arrangement (1), comprising a terminal chute (11, 12, . . . ), adapted to
- the takeover a conveyed object (9), in particular a postal parcel (9), at a takeover area (A1), in particular from an upstream feed in device (7);
- for transferring the conveyed object (9) at a transfer area (A3), in particular at a terminal (4);
- for transmitting the conveyed object (9) in a chute area (A2) from the takeover area (A1) to the transfer area (A3),
- wherein the terminal chute is inclined downwardly in the conveying direction (F) so that the conveyed object (9) is conveyed in a gravitationally sliding manner,
- in particular comprising means for reducing damage to the conveyed material.

DETAILED DESCRIPTION

It is the object of the present invention to provide an improved conveyor arrangement. This is solved by a device according to the main claims; embodiments are the subject of the subclaims as well as the description.

The invention provides for reducing the risks of damage to conveyed goods in the vicinity of the terminal by means of specific improvements.

The invention is characterized by various measures to prevent the formation of jams in connection with the terminal chutes.

The invention is particularly suitable for conveying postal parcels as conveyed goods and/or for conveying polybags as conveyed goods. Polybags are film-packed conveyed goods without a rigid outer contour.

A suitable conveyed item, in particular a postal parcel, has a weight of 20 kg, which does not exclude the use of lighter and heavier parcels. In particular, the conveyor arrangement is set up to convey a conveyed item, in particular a postal parcels of 50 kg. In addition, it may also be possible to convey so-called polybags, i.e. conveyed goods that are packaged in a film, such as items of clothing.

An terminal is an area where the material to be conveyed parcels is stored, at least for a short time, in order to be transferred from there to a delivery van, for example.

BRIEF DESCRIPTION OF THE DRAWINGS

The invention is explained in more detail below with reference to the figures; herein shows.

DETAILED DESCRIPTION OF THE PREFERRED EMBODIMENTS

Figure 1:
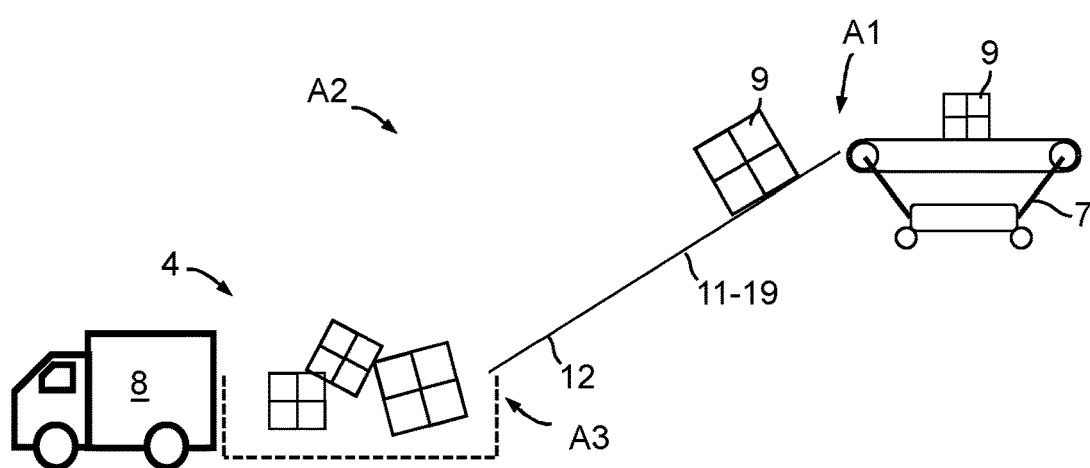
FIG. 1 schematic a design of the conveyor arrangement in side view.
Figure 2:
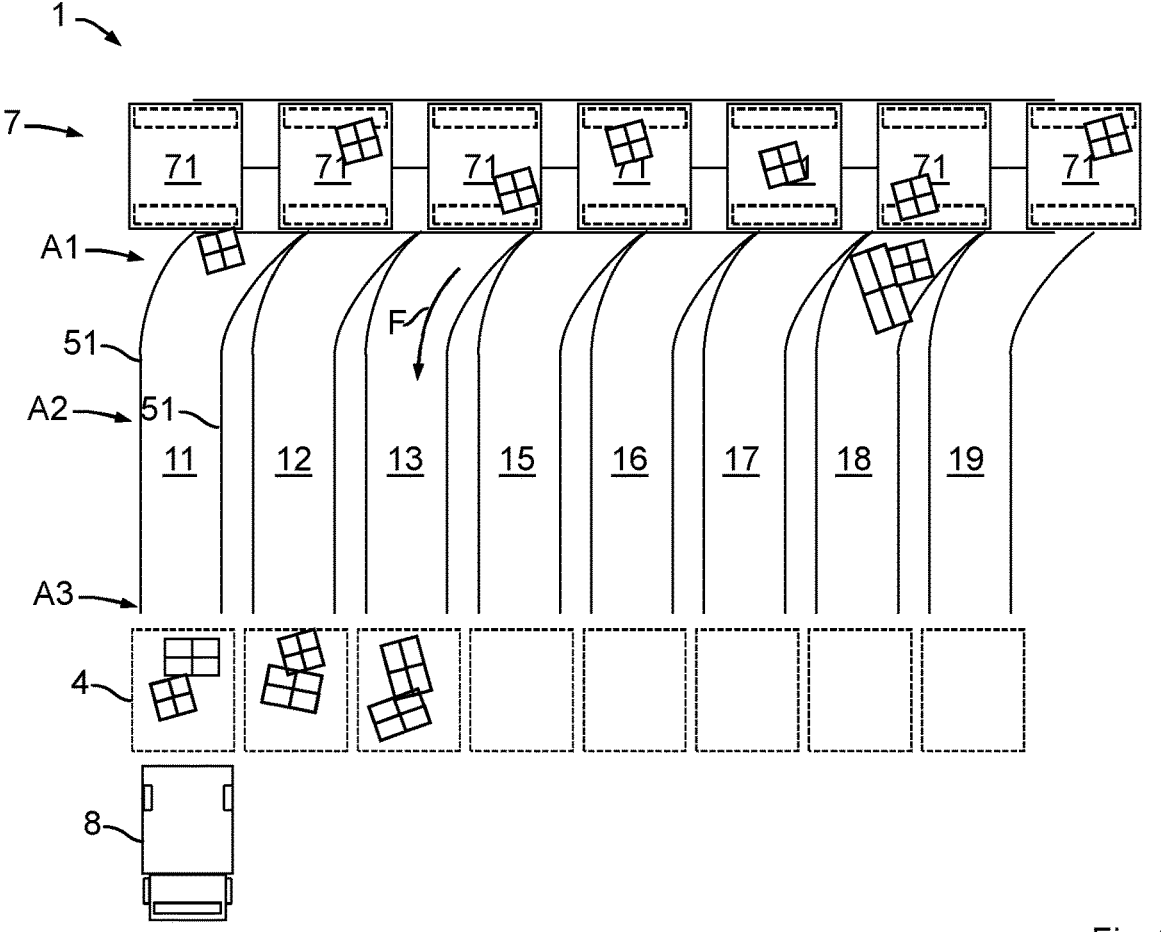
FIG. 2 schematically the structure of an embodiment of the conveyor arrangement in plan view.

FIGS. 1 and 2 show a conveyor arrangement 1 according to the invention. An object 9 to be conveyed, for example a postal parcel, is fed by a sorter 7 with a plurality of sorting carriages. From the sorter 7, the conveyed object 9 passes via a chute selected from a plurality of chutes 11-19, in each case to a terminal 4. At the terminal 4, the conveyed object is stored at least briefly in order to be transferred from there to a delivery van 8.

The chutes each comprise a takeover area A1, followed by a chute area A2. In chute area A2, the conveyed object 9 slides downward at least in sections to reach a transfer area A3. Rigid side guides 51 ensure that the conveyed object 9 reaches the terminal. In the chute area A2, very large height differences are overcome in some cases. Due to space optimization, chute area A2 is therefore very steep, which leads to a large acceleration of the conveyed object 9. This could lead to damage to the conveyed material, in particular when it hits the terminal 4. In addition, the terminals 4 are lined up closely for reasons of space, so that the width of each terminal chute 11 . . . 19 is limited. This can lead to blockages, in particular at the takeover area A1, as shown at chute 18. The takeover area A1 can have a taper in the conveying direction F of the chute.

Not shown in the figures is, that a brake belt can be provided in the chute area. The braking belt is set up to brake a conveyed object sliding down at high speed. For this purpose, the brake belt has a conveyor belt which is operated at low speed in the conveying direction.

Figure 3:
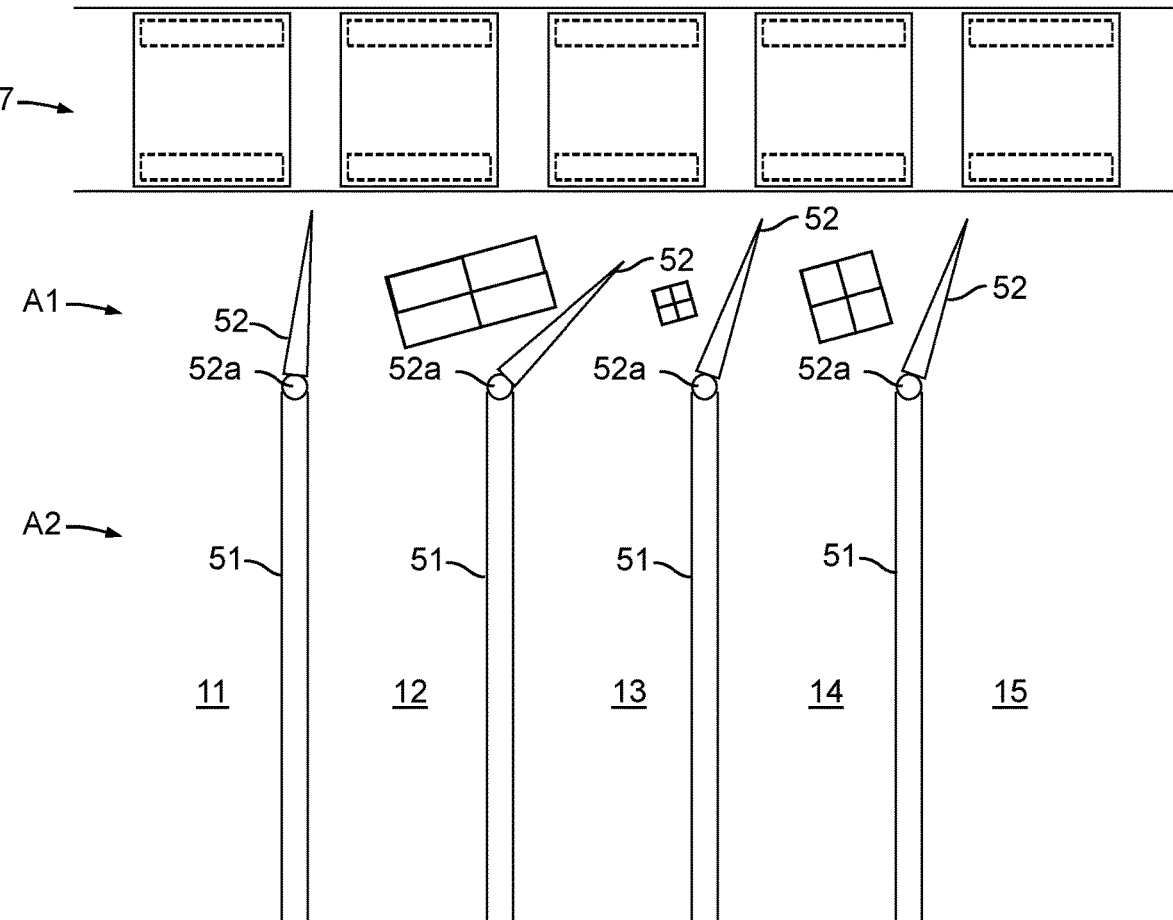
FIG. 3 schematically the structure of an embodiment of the conveyor arrangement in plan view.

FIG. 3 shows details of a further development of the conveyor arrangement 1 according to FIG. 1. A movable side guide 52 is provided, in particular at the takeover area A1. By means of the movable side guide, the width of the chute can be adapted at least in sections, in particular at the takeover area A1, to the size of the parcel currently to be taken over. The movement can take place by pivoting or shifting. The movement is effected by an actuator 52a.

Figure 4:
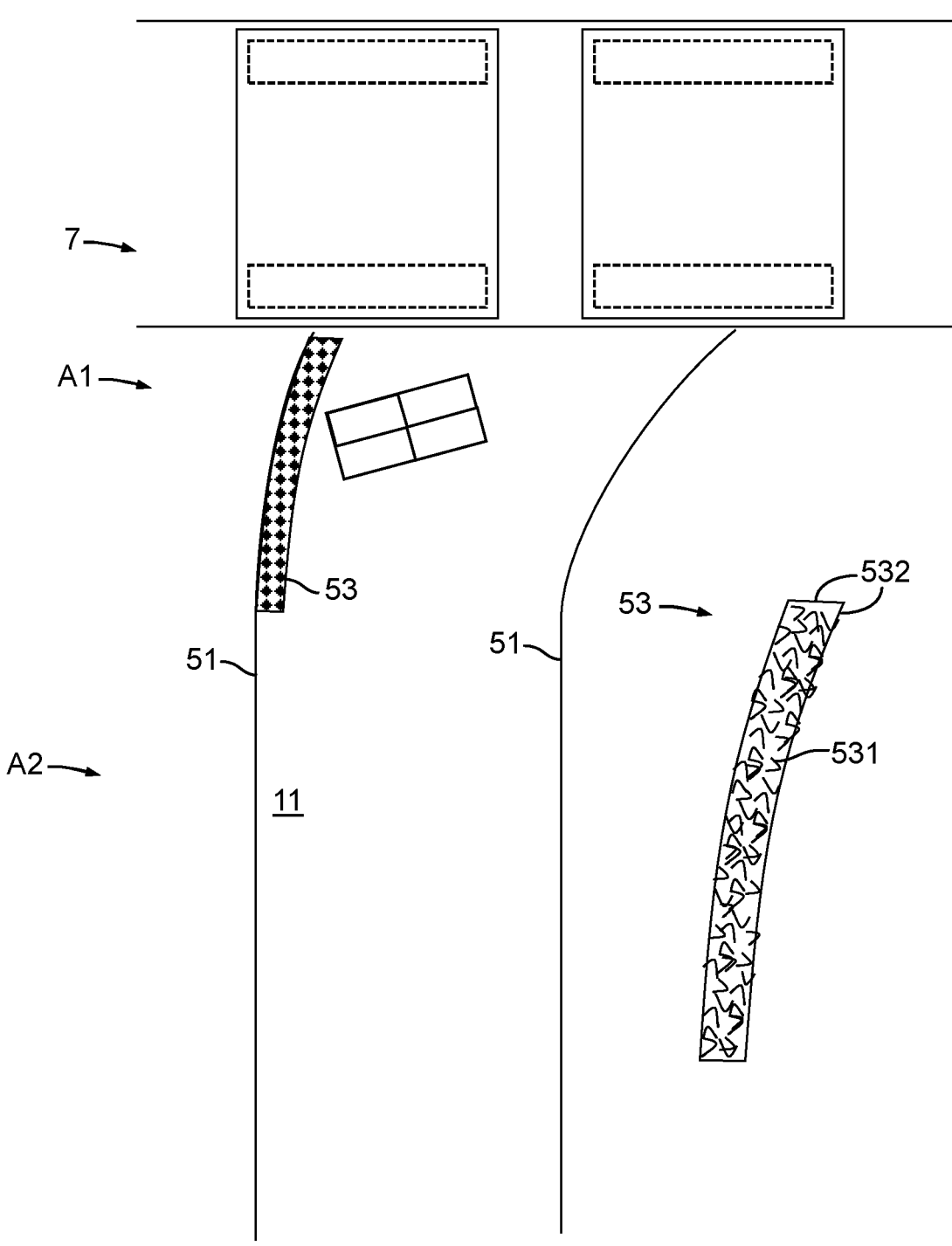
FIG. 4 schematically the structure of an embodiment of the conveyor arrangement in plan view.

FIG. 4 shows details of a further development of the conveyor arrangement 1 according to FIG. 1. In the takeover area A1, the side guide 51 comprises a sliding cushion element 53. This sliding cushion element 53 prevents or reduces damage to a parcel hitting the side guide. The sliding cushion element 53 is shown enlarged on the right in FIG. 4. It includes one or more cushion elements 531, for example, cushioning chips that are commonly used to cushion the interior of a parcel with delicate contents may be used for this purpose. However, such cushioning elements usually have an unfavorable coefficient of friction. Therefore, the cushioning elements are enclosed with a sliding film 532. The sliding film 532 has a lower coefficient of friction than the cushioning elements. In addition, the sliding film allows mechanical impacts of the parcel to pass through to the cushioning elements without being damaged. Such sliding pad elements are known from indoor climbing playgrounds for protecting the playing children from the hard climbing frame.

Figure 5:
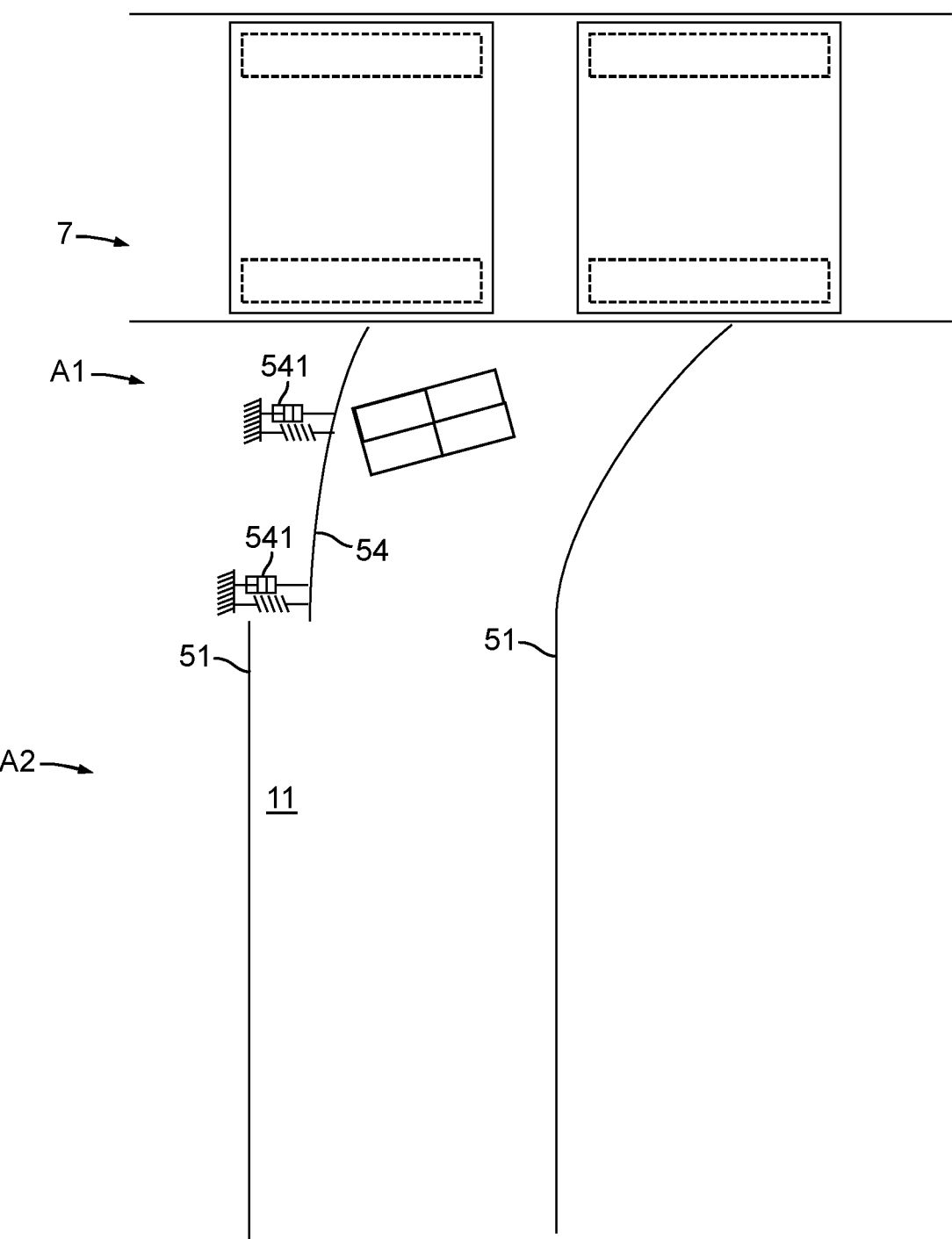
FIG. 5 schematically the structure of an embodiment of the conveyor arrangement in plan view.

FIG. 5 shows details of a further development of the conveyor arrangement 1 according to FIG. 1. Similar to FIG. 4, a side guide with a damping effect is provided. The side guide 54 can be moved in a damping manner. For this purpose, the side guide 54 is flexibly mounted by means of a spring damper arrangement 541. If a parcel strikes the side guide 54, the side guide can move away in the direction of impact. The spring damper arrangement 541 brakes the movement and returns the side guide to an original position.

Figure 6:
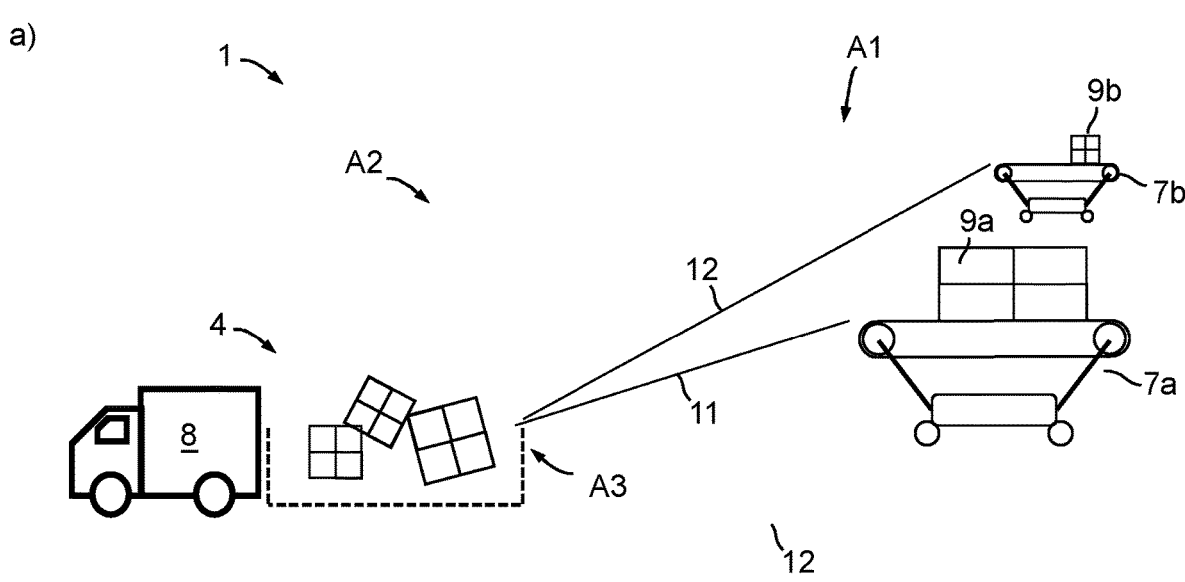
FIG. 6 schematically the structure of an embodiment of the conveyor arrangement in different views.
Figure 6:
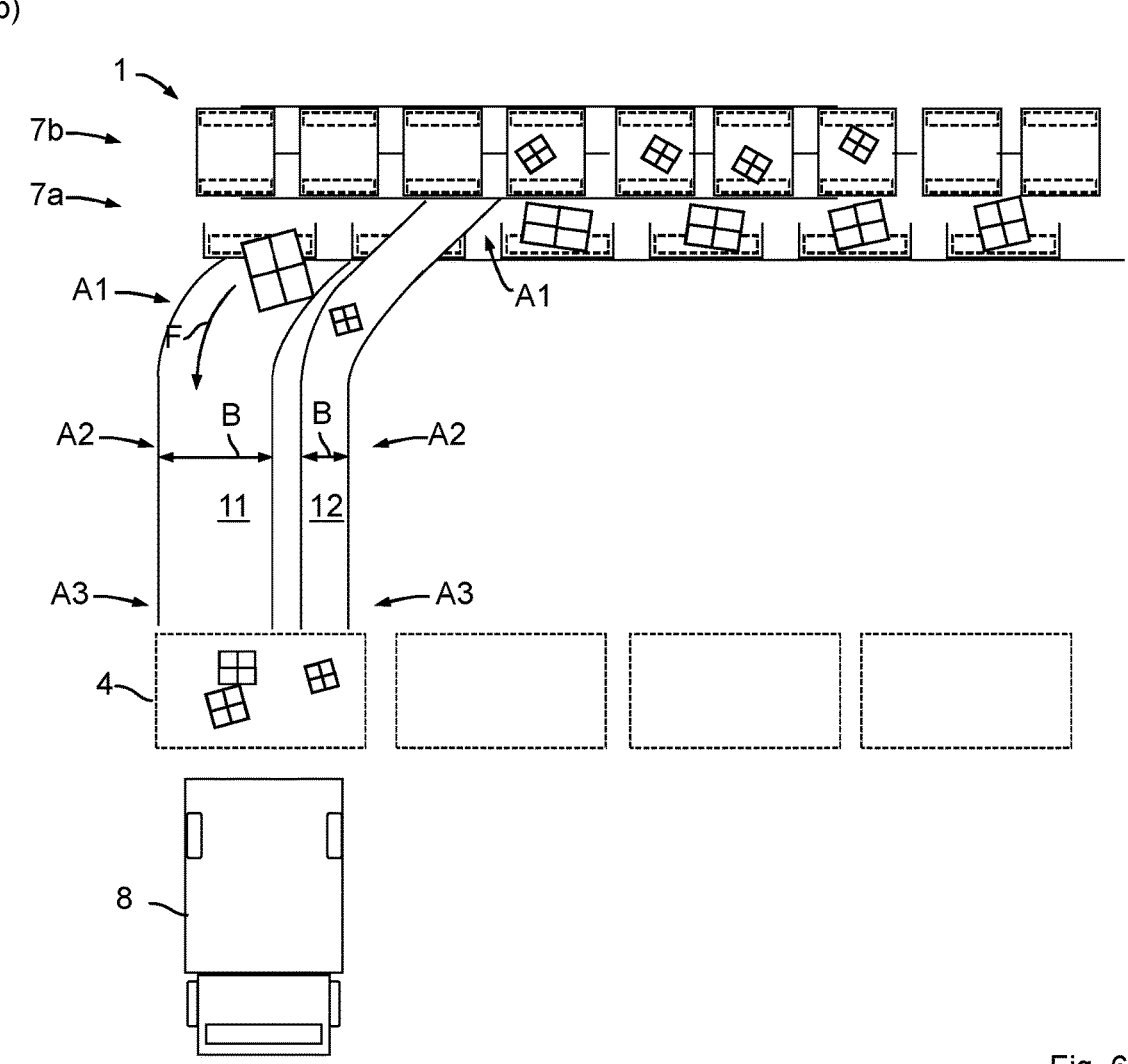
Figure 6:
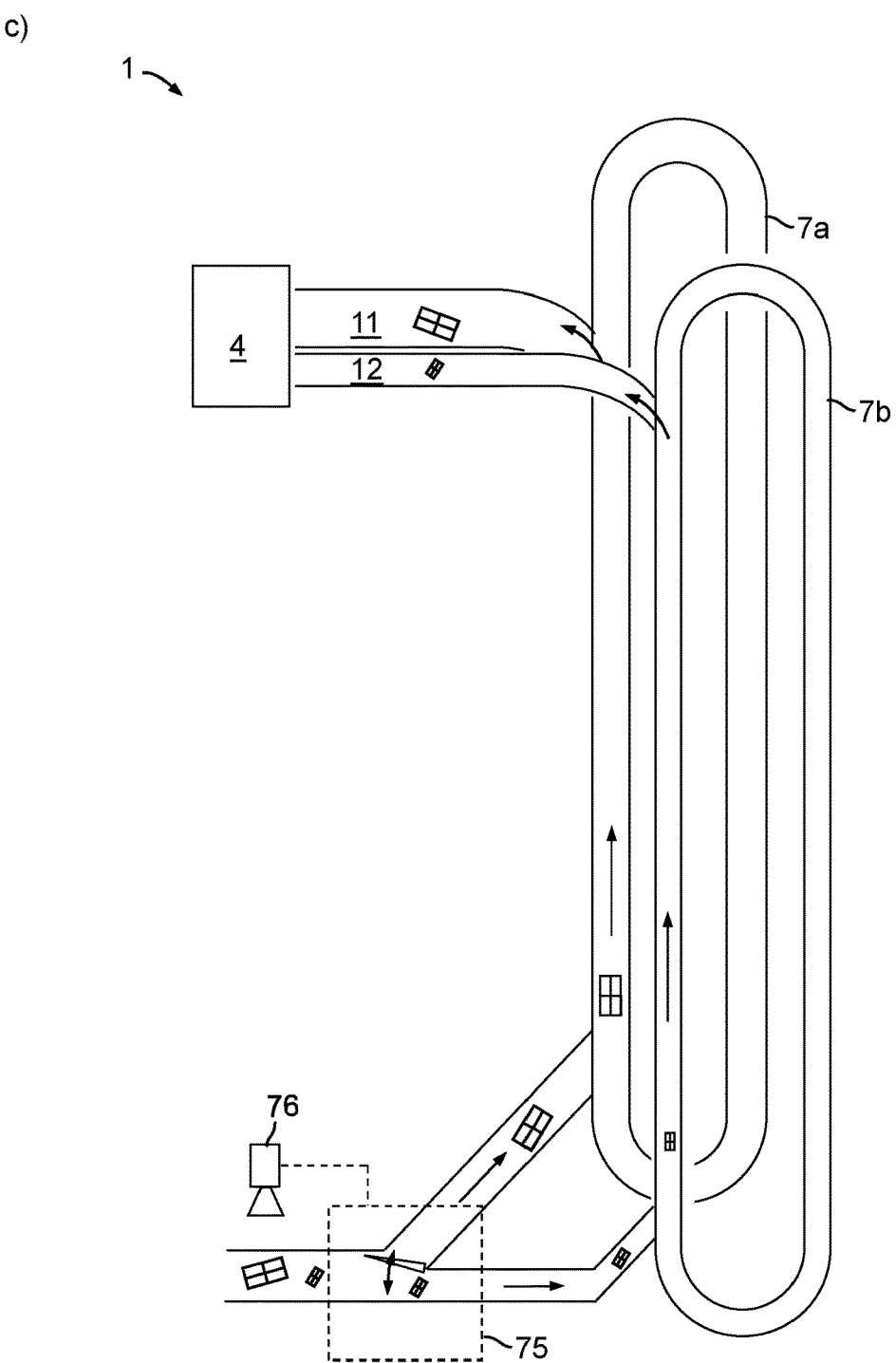

FIGS. 6a and 6b show details of a further development of the conveyor arrangement 1 according to FIG. 1. Two adjacent terminal chutes 11, 12 each have different minimum widths B. The minimum width B is the smallest width of the respective chute, which in this respect defines the maximum parcel size that can pass the respective terminal chute. The minimum width B of the first, wider terminal chute 11 is, for example, 1 m; the minimum width B of the second, narrower terminal chute 12 is, for example, 0.5 m. The two terminal chutes 11, 12 can each open into the same terminal 4.

The sorter is programmed in such a way that it discharges the parcels into the respective terminals depending on the parcel size, provided that the two terminal chutes 11, 12 are each connected to the same sorter at the takeover area A1.

In a further development, the two terminal chutes 11, 12, at the takeover area A1 are each connected to different feed in devices 7, in particular to different sorters 7. In the present example, the first terminal chute 11 is connected to a first sorter 7a, which is provided in particular for sorting larger parcels; the second terminal chute 12 is connected to a second sorter 7b, which is provided in particular for sorting smaller parcels.

As shown in FIG. 6c, the conveyor arrangement can have a presorting station 75 which, based on the size of the respective parcel, selectively feeds it to one of the sorters 7a, 7b. To determine the size of a parcel, a parcel size detector 76 is provided, for example a camera with associated image evaluation. The pre-sorter is adapted to selectively feed the parcels to one of the sorters 7a, 7b on the basis of the determined size.

Figure 7:
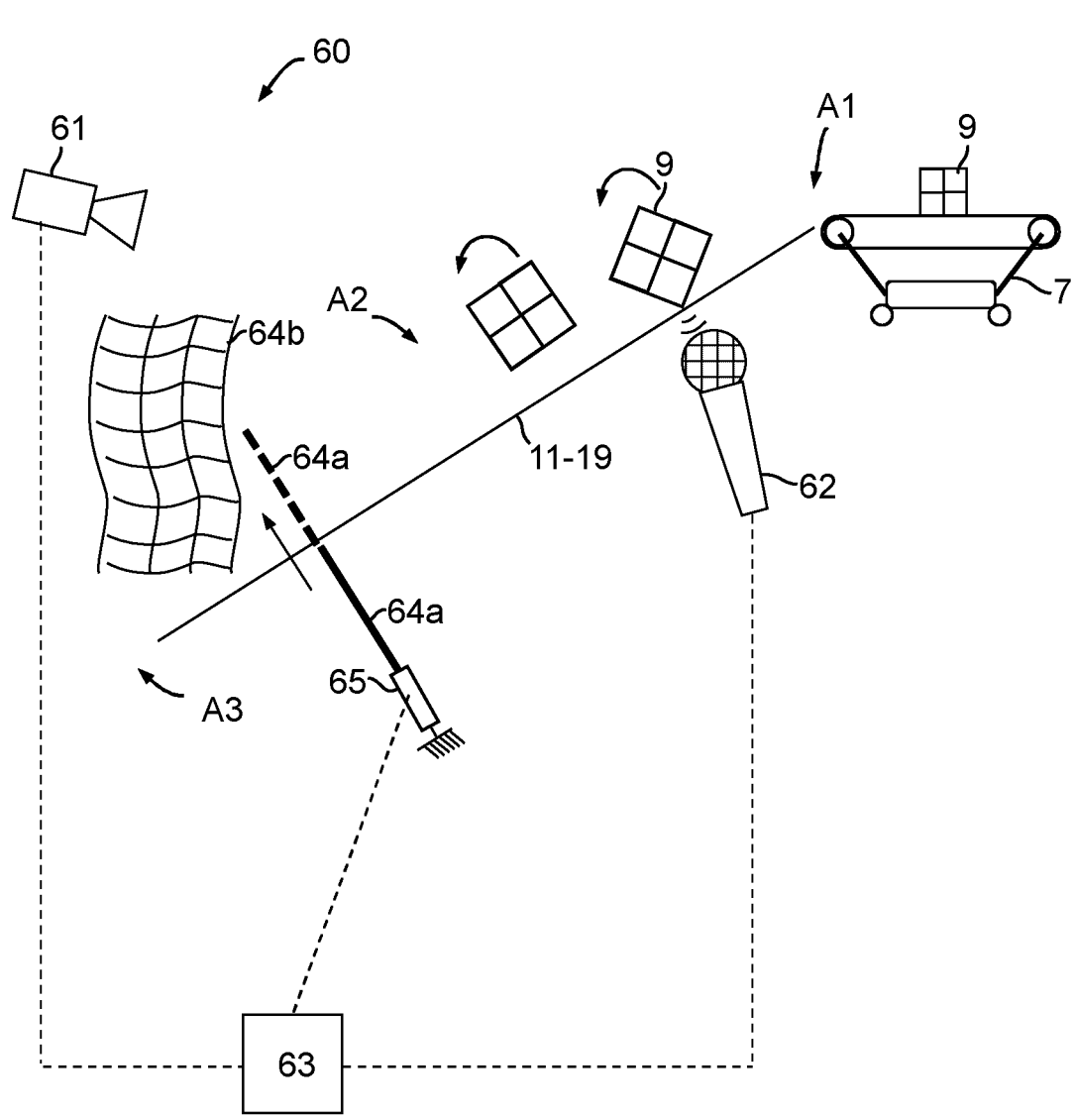
FIG. 7 schematically the structure of an embodiment of the conveyor arrangement in side view.

FIG. 7 shows a parcel 9 which has started to tumble. When it tumbles, the parcel makes a turn of its own. It rolls instead of just sliding. Due to the lack of sliding friction, the parcel accelerates strongly and can therefore hit the terminal 4 with increased speed.

The conveyor arrangement now includes a tumble detection system 60. There are various detection options for this purpose.

In a first possibility, the terminal chute is monitored and evaluated by means of a camera 61. The visual appearance is characterized by rapid changes in the views of the parcel; in particular, the visible frontal area changes at a high frequency depending on whether the parcel is oriented parallel to the viewing direction or at an angle to the viewing direction of the camera 61. In the case of a sliding packet, the visual appearance changes much more slowly.

In a second option, the terminal chute is monitored using a microphone 62. The microphone 62 detects a sound profile at the terminal chute. In particular, a tumbling parcel produces discrete knocking sounds when it hits a surface with an edge.

The images or sound profiles are evaluated by a control system.

The control 63 may be formed by a self-learning system. For this purpose, films or sound profiles of a large number of moving parcels were read in and compared with a manual evaluation.

If a tumbling packet is detected by the tumble detection 60, then a tumble barrier 64 is activated. The tumble barrier 64 is capable of at least slowing down or stopping the tumbling parcel. In the present case, the tumbling barrier 64a is a wall which, in the normal state, is arranged outside of the chute area of the terminal chute (solid line). An actuator 65 activates the tumble barrier 64a and moves it into the chute area of the terminal chute (dashed line). The tumbling parcel is at least slowed down or even stopped by the tumble barrier 64a. The tumble barrier can then be lowered again and the parcel can slide to the terminal.

The tumble barrier can equally serve as a backlog barrier. If the terminal is filled with parcels, a backlog can occur in the chute area. The greater this backlog, the greater the pressure loads on parcels below, which can lead to damage. By means of such a backlog barrier, overlying parcels can be supported so that parcels lying above the backlog barrier do not exert any pressure load, or at most a reduced pressure load, on the parcels lying below.

In an alternative embodiment, the tumble barrier is a safety net 64b that falls as needed. In an alternative embodiment, the tumble barrier is an air bag that is filled with air as needed. In principle, this does not change the control by the tumble detection system 60.

Figure 8:
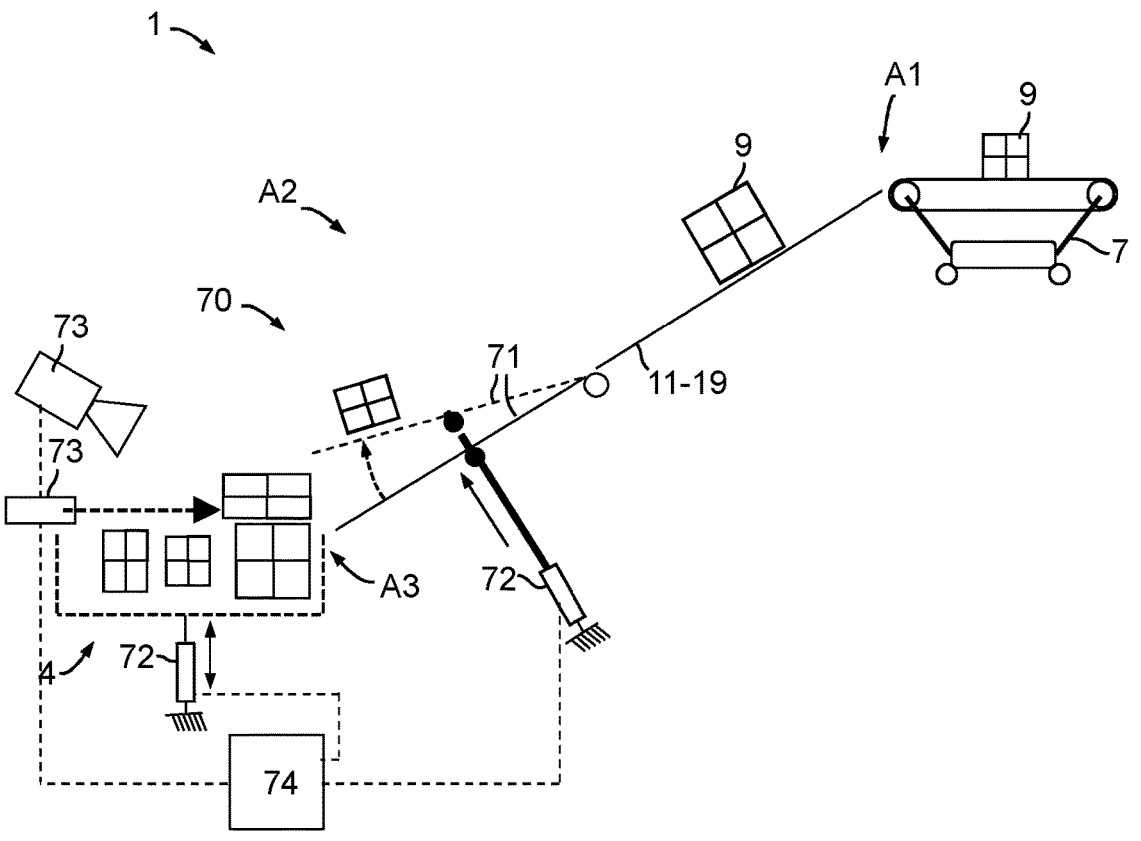
FIG. 8 schematically the structure of an embodiment of the conveyor arrangement in side view.

In the configuration shown in FIG. 8, the terminal 4 is already filled by a large number of parcels. There is a risk that subsequent parcels will remain in the chute area A2 and will not be able to slide down. This is particularly disadvantageous if the terminal comprises a lattice box which is taken away after filling. The embodiment according to FIG. 8 now has a direction-changing conveyor section 70 in the chute area. The core of the direction-changing conveyor section 70 is a position-changing conveyor surface 71, which can be displaced between at least two positions by means of an actuator 72. In a first position (solid line), the parcels can be deposited on a lower level in the end station. In a second position, the parcels can be deposited on an upper level of the terminal 4, for example on top of the previously deposited parcels. The inclination of the position-variable conveying surface 71 can be adjusted for this purpose.

The variable-position conveying surface can be formed by a chute or the top of a belt conveyor, especially a brake belt.

The direction-changing conveyor section, the position-changing conveyor surface and the actuator are controlled by a control 74. The control 74 uses the signals of an occupancy sensor 73. The occupancy sensor 73 can be a camera with corresponding image evaluation. Alternatively, the occupancy sensor 73 can be a light barrier or a light sensor.

FIG. 8 shows a further solution said problem. For this purpose, the terminal 4 itself is designed to be height-adjustable. An actuator 72 can be used to adjust the height of the terminal, in particular to lower it, if the occupancy detection system has determined that the end station is filled with a large number of parcels.

Figure 9:
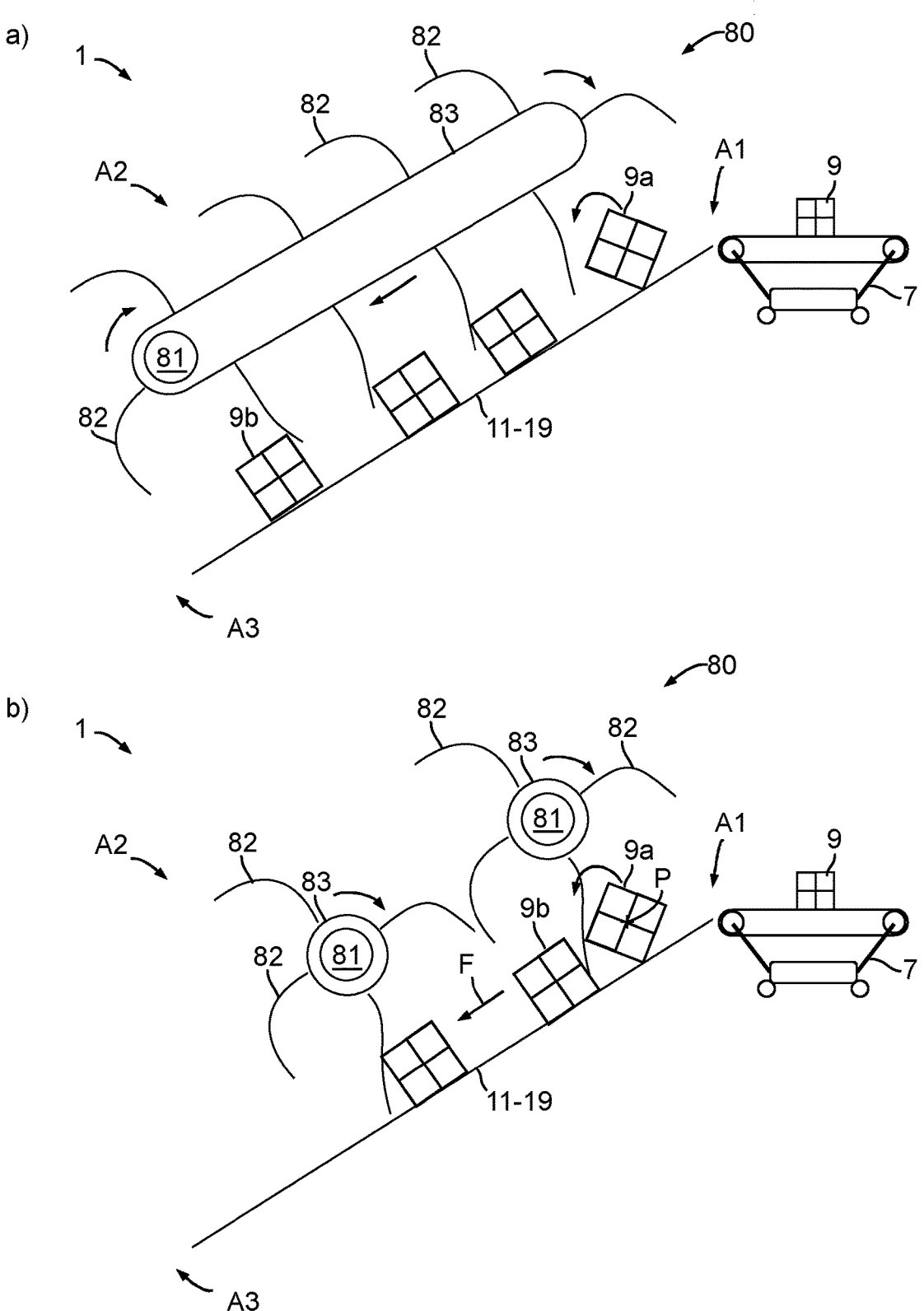
FIG. 9 schematically the structure of an embodiment of the conveyor arrangement in side view.

FIG. 9 shows another solution. A brake pusher arrangement 80 is provided above the slides. The brake pusher arrangement comprises several brake pusher 82, which are arranged circumferentially on a brake pusher guide 83. The brake pusher are operated in such a way that a brake pusher is moved at least in sections above the chute in the conveying direction in front of and/or behind a conveyed object 9. The brake pusher 82 has a decelerating effect on the conveyed object 9 if the conveyed object slides too fast (see conveyed object 9a). The brake pusher 82 has an accelerating effect on the conveyed object if the conveyed object slides too slowly (see conveyed object 9b). A drive 81 is provided to drive the rotating movement of the brake pusher.

Essentially, the brake pusher thus fulfills a similar function to a brake belt (see as yet unpublished DE 10 2021 106 255.1), which is operated at constant speed. Due to the positive interaction with the conveyed object and the brake pusher, which is suspended above the chute, tumbling conveyed materials can also be gently caught or even prevented from tumbling.

The term "tumbling" refers to a translatory movement of the conveyed object in the conveying direction, which is accompanied by a rotating movement of the conveyed material. The rotating movement takes place around the axis of tumbling, which is approximately horizontal and transverse to the conveying direction. In other words, during tumbling, the conveyed object also performs a rolling motion.

Figure 10:
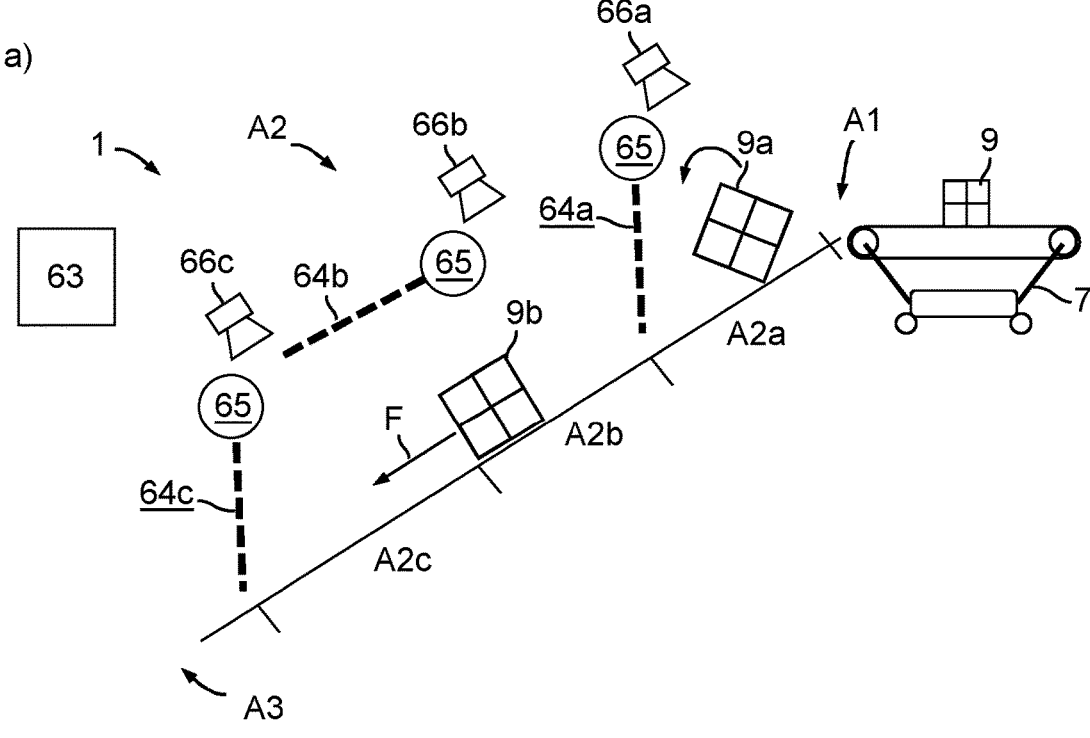
FIG. 10 schematically the structure of the conveyor arrangement in side view.
Figure 10:
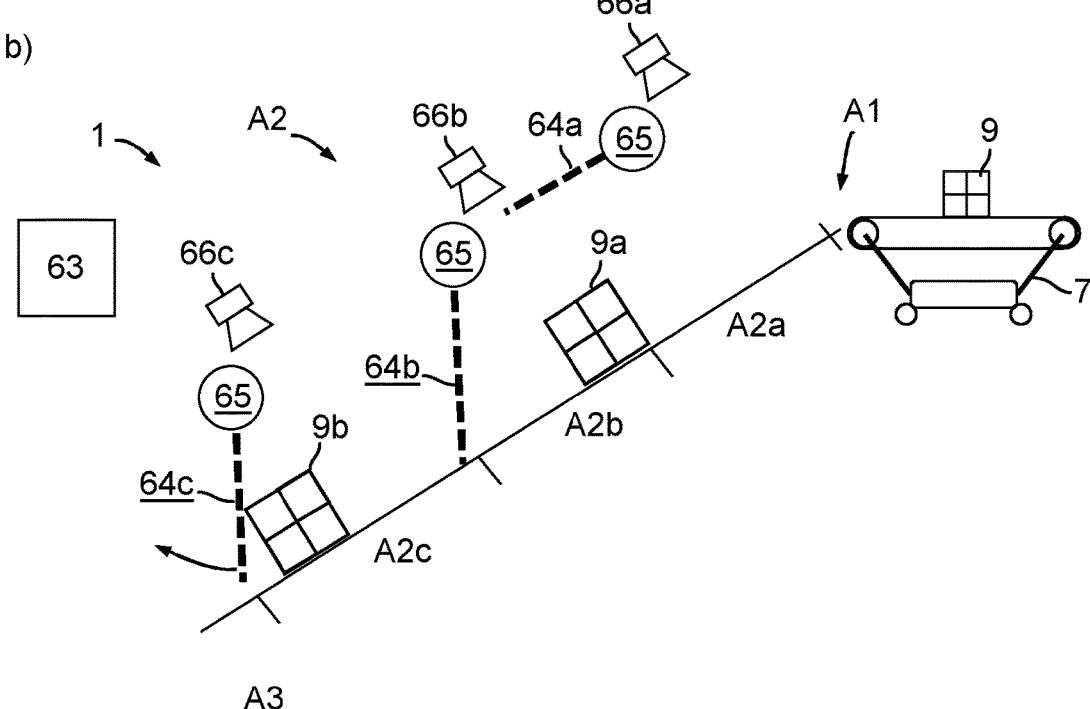

FIG. 10 shows another solution. The chute area A2 is divided into several partial chute areas A2a, A2b, A2c by means of several, here exemplarily three, tumble barriers 64a, 64b, 64c arranged one behind the other. One of the tumble barriers 64a, 64b, 64c is arranged downstream of each of the partial slide areas A2a, A2b, A2c.

The tumble barriers 64 can be selectively transferred between an open position and a closed position. A conveyed object 9 can only pass from the upstream partial chute area A2a, A2b, A2c into the respective downstream area, namely the downstream partial chute area A2b, A2c or the transfer area A3, if the respective tumble barrier is in its open position. In the closed position, the conveyed object is held in the respective partial chute area.

An occupancy sensor 66a,b,c is assigned to each of the partial chute areas A1a,b,c, which is used to determine whether or not a material is present in the respective partial chute area.

The tumble barriers are used as follows. By default, the tumble barriers are in their closed position. If a first material 9a enters the first partial chute area A2a from the takeover area A1, the first material 9a is inevitably stopped by the first tumble barrier (FIG. 10a). If the first conveyed object starts to tumble, the tumbling is prevented by the first tumble barrier 64a.

After the first conveyed object 9a has been stopped by the first tumble barrier 64a, the first tumble barrier 64a can be moved to its open position so that the first conveyed object can enter the second partial chute area A2b. However, second conveyed object 9b is present in the second partial chute area A2b. In this case, the transfer of the first tumble barrier 64a to its open position is delayed until no material is present in the second partial chute area A2b (FIG. 10b). This is determined by the second occupancy sensor 66b.

The same procedure is followed at the second tumble barrier 64b.

Each tumble barrier is transferred between the respective positions by means of a drive unit 65.

The majority of tumble barriers thus form a cascade of tumble barriers. Even with large inclines in the chute area, excessive speed of the conveyed goods can be prevented. In addition, the conveyed goods are prevented from colliding with each other in chute area A2.

A control 63 is provided for controlling the drive units 65. Output signals from the occupancy sensors 6 serve as input variables.

In this regard, it is not necessary that the tumble barriers be able to stop any type of conveyed material. In one embodiment, this allows small envelopes to pass through a gap between the chute and the tumble barrier (in the closed position) without negating the benefits for larger conveyed items.

Figure 11:
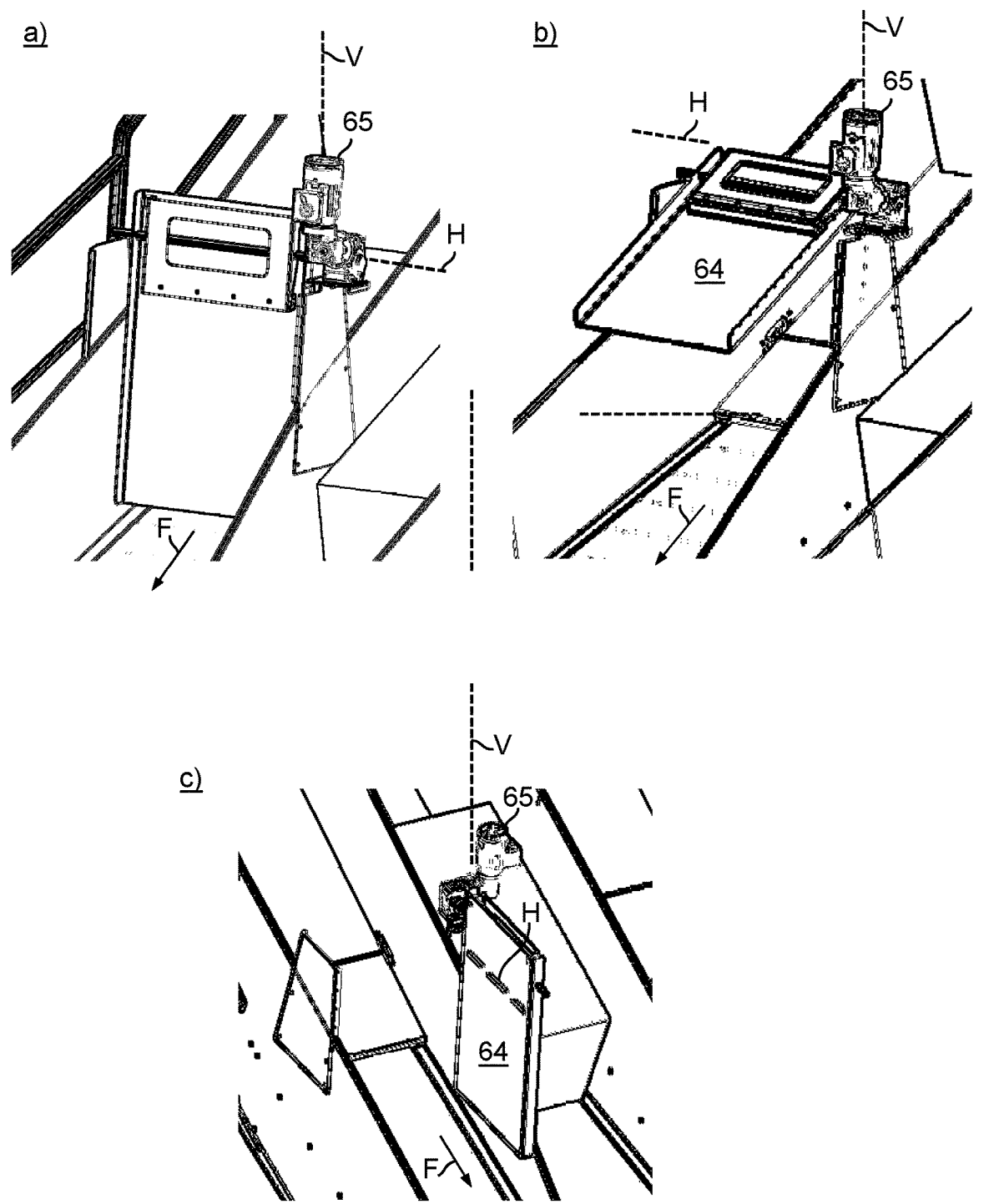
FIG. 11 schematically of the tumble barrier of the conveyor arrangement according to FIG. 10 in different positions.

FIG. 11 shows the tumble barrier in different positions. FIG. 11a shows the tumble barrier in the locked position. By pivoting about a horizontal axis H, the tumble barrier is transferred to the open position (FIG. 11b). By pivoting about a vertical axis V, the tumble barrier is transferred to a maintenance position (FIG. 11c). In particular, in the maintenance position a person can walk along the chute area A2 and pass the tumble barrier 64 without climbing. The axes H, V do not have to be aligned exactly horizontally or vertically.

The tumble barrier has an impact surface 67 (FIGS. 12 and 13), which points in the opposite direction to the conveying direction F. The material to be conveyed hits the impact surface 67. Conveyed objects 9 that slide along the chute 11 in conveying direction F hit the impact surface 67 on the tumble barrier 64. The impact surface 67 is kept flexible.

7

8

Figure 12:
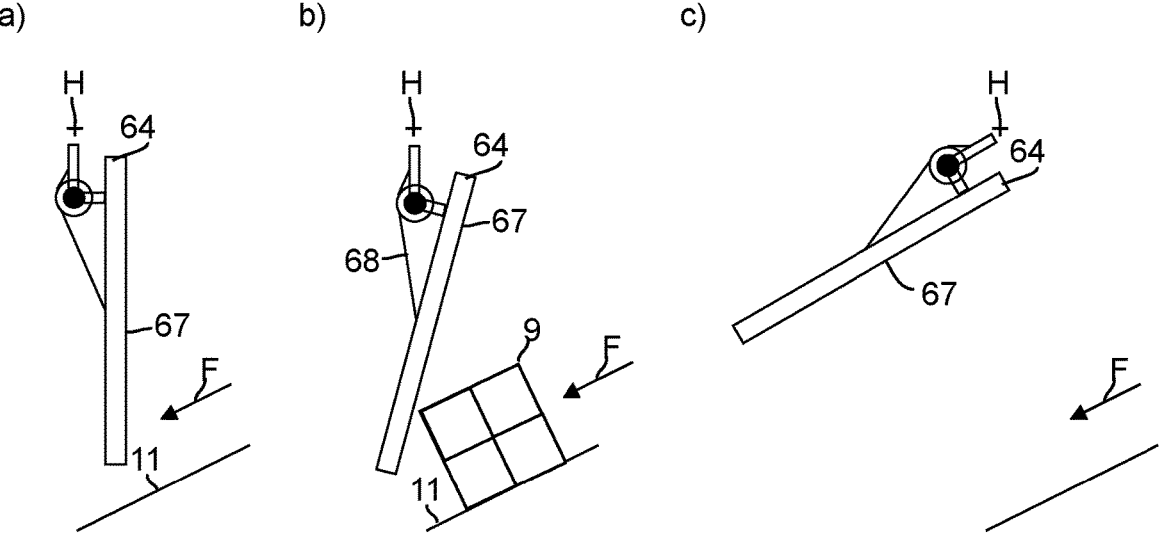
FIG. 12 details of the tumble barrier according to FIG. 11.
Figure 13:
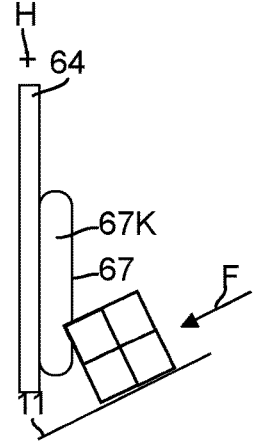
FIG. 13 details of an embodiment of the tumbler barrier according to FIG. 11 having an impact body.

In the embodiment shown in FIG. 12, the resilience results from a slight pivoting of the tumble barrier in the closed position. The tumble barrier is spring-loaded in the closed position. If a conveyed object 9 hits the tumble barrier in its closed position, depending on the force, the tumble barrier 64 and thus the impact surface 67 are slightly impacted out of the fully closed position without reaching the open position. By means of a spring force, exemplarily achieved by a torsion spring 68, the tumble barrier is loaded into the closed position and a obtaining the open position is prevented.

In the embodiment according to FIG. 12, the resilience results from a deformable impact body 67K, which is firmly attached to the tumble barrier. The impact body can be a cushioning element which is elastically or inelastically deformed upon impact of the conveyed material.

LIST OF REFERENCE NUMERALS

1 conveyor arrangement
4 terminal
7, 7a, 7b sorter/feed in device
8 delivery van
9 conveyed object (postal parcel)
11-19 terminal chute
51 rigid side guide
52 movable side guide
52a actuator
53 sliding cushion element
54 dampingly movable side guide
541 spring damper arrangement/resetting element and/or braking element
60 tumble detection
61 camera
62 microphone
63 control
64 tumble barrier
65 actuator
66 occupancy sensor
67 impact surface
67K impact body
68 torsion spring
70 direction changing conveyor section of the chute area
71 position-variable conveyor surface
72 actuator
73 occupancy sensor
74 control
75 pre-sorting station
76 parcel size detector
80 brake pusher arrangement
81 drive
82 circulating brake pusher
83 Brake pusher guiding
A1 takeover area
A2 chute area
A2a,b,c partial chute area
A3 transfer area
F conveying direction
B minimum width
H horizontal axis
V vertical axis

The invention claimed is:

1. Conveyor arrangement (1), comprising a terminal chute (11, 12, . . . ), adapted to the takeover a conveyed object (9) at a takeover area (A1);
for transferring the conveyed object (9) at a transfer area (A3) at a terminal (4);

for transmitting the conveyed object (9) in a chute area (A2) from the takeover area (A1) to the transfer area (A3),
wherein the terminal chute is inclined downwardly in the conveying direction (F) so that the conveyed object (9) is conveyed in a gravitationally sliding manner,
comprising a plurality of terminal chutes arranged side by side, each terminal chute being laterally delimited by a side guide (51, 52),
characterized in
that the side guide is mounted in a dampingly moving manner, such that in the event of an impact of a conveyed object (9) on the side guide (54), the latter can be moved away in the direction of impact.

2. Conveyor arrangement according to claim 1,
characterized in
that the side guide comprises a movable side guide (52), the position of which can be adjusted in a targeted manner.

3. Conveyor arrangement (1), comprising a terminal chute (11, 12, . . . ), adapted to
the takeover a conveyed object (9) at a takeover area (A1);
for transferring the conveyed object (9) at a transfer area (A3) at a terminal (4);
for transmitting the conveyed object (9) in a chute area (A2) from the takeover area (A1) to the transfer area (A3),
wherein the terminal chute is inclined downwardly in the conveying direction (F) so that the conveyed object (9) is conveyed in a gravitationally sliding manner,
wherein two terminal chutes (11, 12) enter into a common terminal (4), the two terminal chutes (11, 12) each having a different minimum width (B),
wherein the two terminal chutes (11, 12), which enter into the common terminal (4) at the transfer area (A3), are each connected to different feed in devices (7a, 7b) at the takeover area (A1).

4. Conveyor arrangement according to the claim 3,
characterized by
a tumble detection (60), which is arranged to detect a tumbling conveyed object (9).

5. Conveyor arrangement (1), comprising a terminal chute (11, 12, . . . ), adapted to
the takeover a conveyed object (9) at a takeover area (A1);
for transferring the conveyed object (9) at a transfer area (A3) at a terminal (4);
for transmitting the conveyed object (9) in a chute area (A2) from the takeover area (A1) to the transfer area (A3),
wherein the terminal chute is inclined downwardly in the conveying direction (F) so that the conveyed object (9) is conveyed in a gravitationally sliding manner,
characterized by
a tumble barrier (64) which is adapted to at least brake a tumbling conveyed object (9) in a targeted manner, it being possible for the tumble barrier to be activated in a targeted manner for braking a tumbling conveyed object,
wherein it being possible for the tumble barrier to be transferred selectively between a closed position and an open position.

6. Conveyor arrangement (1), comprising a terminal chute (11, 12, . . . ), adapted to
the takeover a conveyed object (9) at a takeover area (A1);
for transferring the conveyed object (9) at a transfer area (A3) at a terminal (4);

for transmitting the conveyed object (9) in a chute area (A2) from the takeover area (A1) to the transfer area (A3), wherein the terminal chute is inclined downwardly in the conveying direction (F) so that the conveyed object (9) is conveyed in a gravitationally sliding manner, wherein the terminal (4) is selectively adjustable in height by means of a height adjustment;

characterized in that the height adjustment is controlled on the basis of an occupancy detection (73, 74) of the terminal, and/or the height of the terminal (4) is set on the basis of the occupancy detection.

7. Conveyor arrangement (1) according to claim 6, characterized in that the terminal (4) is selectively adjustable in height by means of an actuator (7372) of the height adjustment.

\* \* \* \* \*